United States Patent [19]
Abramovitz et al.

[11] Patent Number: 4,809,351
[45] Date of Patent: Feb. 28, 1989

[54] OPTICAL CHARACTER READER

[75] Inventors: Robert G. Abramovitz, Eugene; Robert L. Anderson, Jr., Tigard; Frederick L. Busse; Stuart A. Celarier, both of Portland; Jean-Yves H. Poublan, Beaverton; Lawrence R. Shorthill, West Linn, all of Oreg.

[73] Assignee: SABA Technologies, Inc., Beaverton, Oreg.

[21] Appl. No.: 940,294

[22] Filed: Dec. 11, 1986

Related U.S. Application Data

[63] Continuation-in-part of Ser. No. 742,417, Jun. 7, 1985, abandoned.

[51] Int. Cl.[4] .............................................. G06K 9/22
[52] U.S. Cl. ..................................... 382/59; 235/474; 382/67
[58] Field of Search ......................... 382/59, 61, 62, 65, 382/67, 68; 235/472, 474

[56] References Cited

U.S. PATENT DOCUMENTS

| | | | |
|---|---|---|---|
| 3,496,363 | 2/1970 | Rome | 250/203 |
| 3,713,099 | 1/1973 | Hemstreet | 382/34 |
| 3,713,100 | 1/1973 | Hemstreet | 382/34 |
| 3,831,009 | 8/1974 | McMillin | 235/474 |
| 3,906,202 | 9/1975 | Meyer | 382/59 |
| 3,921,136 | 11/1975 | Bar-Leu | 382/67 |
| 3,947,817 | 3/1976 | Requa | 382/59 |
| 4,072,859 | 2/1978 | McWaters | 250/568 |
| 4,118,687 | 10/1978 | McWaters et al. | 382/59 |
| 4,121,192 | 10/1978 | Wilson | 382/68 |
| 4,260,979 | 4/1981 | Smith | 382/59 |
| 4,345,278 | 8/1982 | Double | 235/474 |
| 4,418,362 | 11/1983 | Nadler | 382/59 |
| 4,485,485 | 11/1984 | Smith et al. | 382/65 |
| 4,553,035 | 11/1985 | Malinsky et al. | 382/59 |

OTHER PUBLICATIONS

David J. Lilja, "Build a Simple Light Pen for the Apple II", *Byte*, Jun. 1983, pp. 395–406.

Houdek, Variable Velocity, Reader Logic, IBM Technical Disclosure Bulletin, vol. 14, No. 8, pp. 2407–2408, Jan. 1972.

George Nagy, Optical Scanning Digitizers, IEEE Disclosure, pp. 13–24, May. 1983.

*Primary Examiner*—Leo H. Boudreau
*Attorney, Agent, or Firm*—Stoel Rives Boley Jones & Grey

[57] ABSTRACT

An optical scanning system operates asynchronously by electro-optically detecting movement of a scanning unit directly from the data being scanned. A first embodiment of the system includes two sets of optical sensors in a hand-held unit. One set extends transversely of a scanning direction for detecting the optical pattern, and a second set is approximately aligned with the scanning direction for detecting relative movement between the pattern and the scanning unit. Relative movement is detected by detecting a pattern in a first subset of the second set of sensors and then sensing a shift of the detected pattern to a second subset of the second set of sensors. In response to detecting a unit movement, the optical states of the first set of sensor elements are polled to record a portion of the pattern along the line. This response is preferably triggered indirectly by calculating an average time interval between relative movements and periodically polling the first set of sensors at a rate set by this average interval. Upon detecting a uniform optical state of the second set of sensors, such as when scanning across a blank region in the pattern, sensing of the optical state of the first sensors continues at periodic intervals so long as the uniform state continues to be detected. The optical information is thus obtained in a succession of steps, and is assembled by the host computer. A second embodiment of the system differs from the first embodiment in that the former uses a rectangular array of imaging elements arranged in rows and columns and calculates an estimate of the instantaneous rate of relative movement. Each of the rows of imaging elements is aligned generally parallel to the scanning direction and changes optical states in a manner analogous to that of the line of second imaging elements described above. The second embodiment promotes increased accuracy during collection of optical information for situations in which the scanning direction is misaligned from the optical information and the scanning velocity is nonuniform.

7 Claims, 10 Drawing Sheets

VIEWING THRU ARRAY, MOVEMENT DIRECTION →

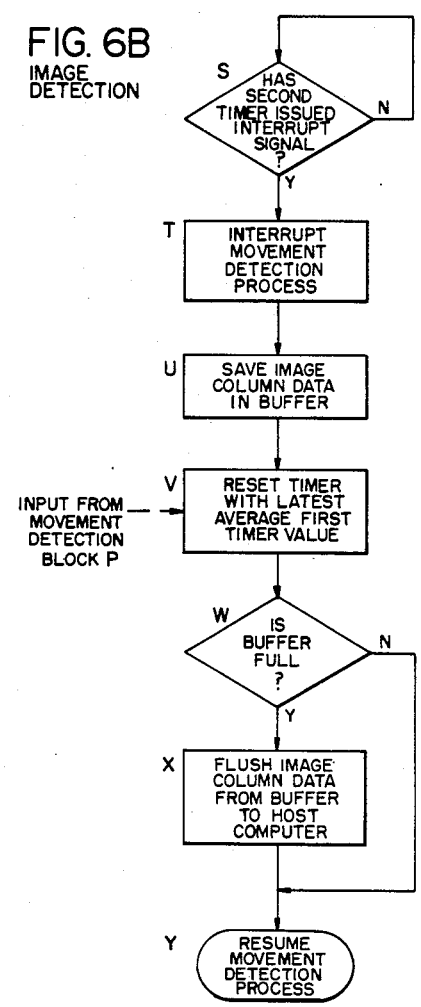
FIG. 6B IMAGE DETECTION
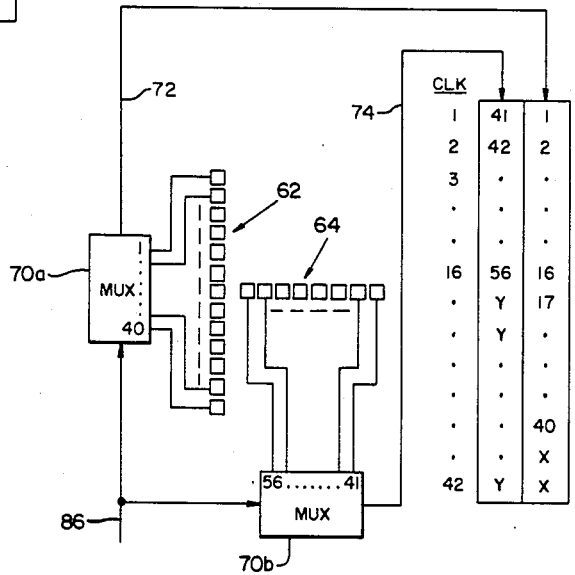
FIG. 7

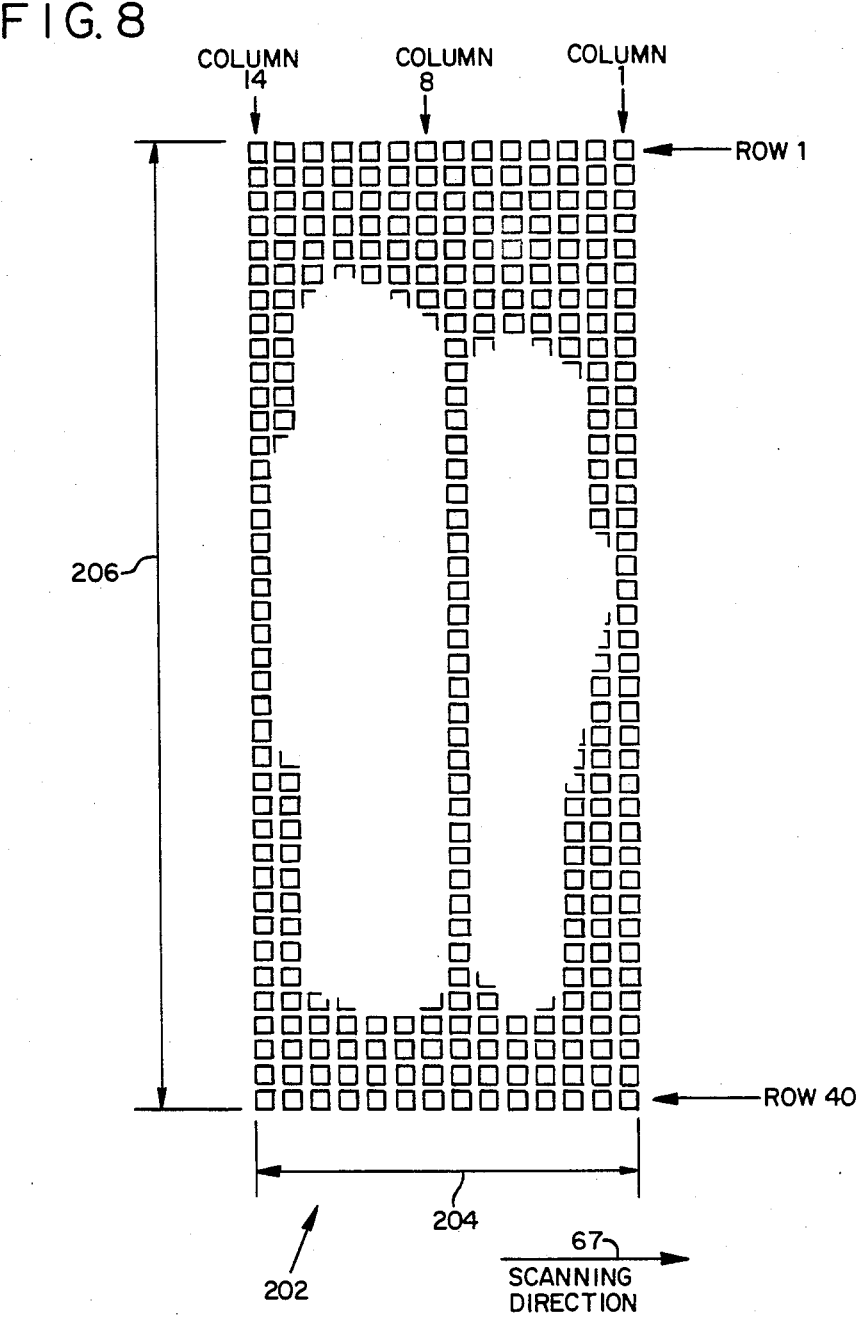

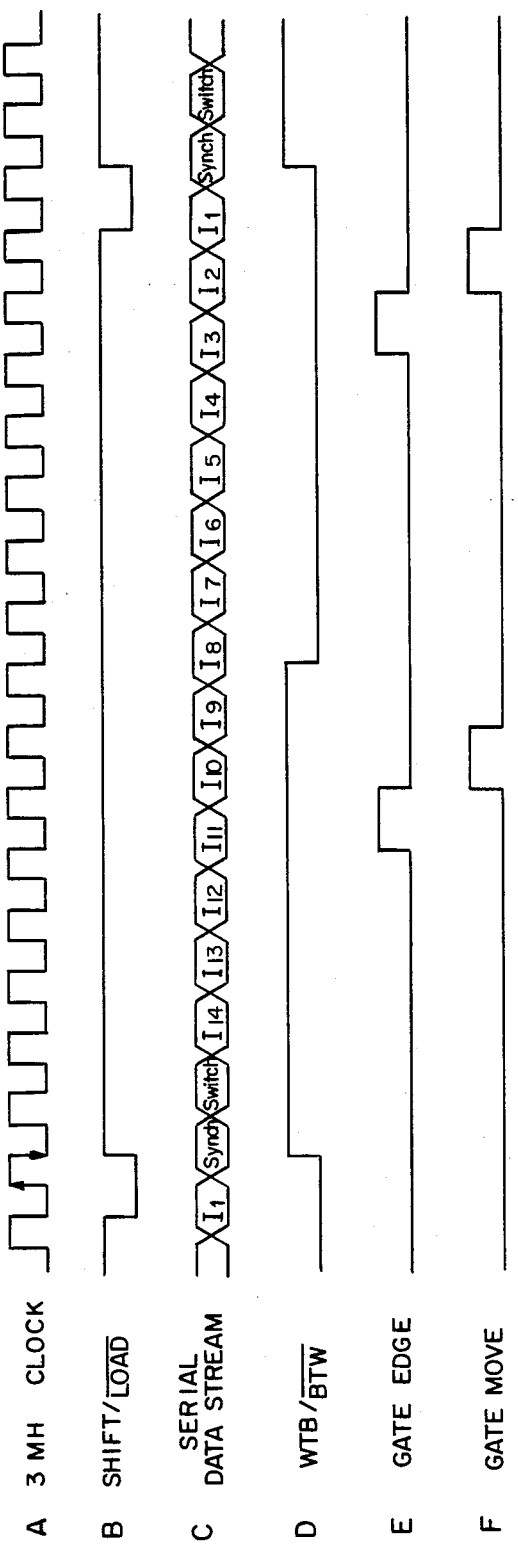

OPTICAL CHARACTER READER

This application is a continuation-in-part of prior U.S. patent application Ser. No. 06/742,417, filed June 7, 1985, now abandoned.

TECHNICAL FIELD

This invention relates generally to optical character readers and, more particularly, to asynchronously operated optical sensing devices for transferring graphic, printed, typed, or other character information into a computer.

BACKGROUND OF THE INVENTION

Systems for electronically scanning data symbols have been developed for various uses. Such systems, however, are generally limited by constraints on the character set, the requirement for a uniform scanning speed, or the awkward mechanical systems used to determine or control the position of the unit over the scanned optical information.

Most conventional optical character readers are cumbersome devices through which documents of various sizes are passed, with the documents moving through a reading zone. The document is carefully aligned and then scanned synchronously, i.e., at a fixed speed, to convert successive slices of the optical image on the document into digital form. The output digital data is computer-processed to identify the characters occupying the scanned field. In such systems, registration and synchronism between the scanning system and the document must be precisely controlled. Consequently, optical character readers typically involve relatively complex electro-mechanical optical subsystems. Accordingly, they are too expensive to be used economically in small, e.g., microcomputer, applications, such as word processing and personal computers.

In many merchandising operations, a bar code is read by an optical scanning device to provide accounting and inventory information for the merchandiser. The well defined spacing of the bars, together with their considerable length, enables hand-held or stationary scanning units to be used without requiring a uniform scanning speed or precise registration between the scanning system and the bar code tag.

One method for compensating a seven line bar code reader against the speed variations inherent in a hand-held scanning unit is shown in IBM Technical Disclosure Bulletin, Vol. 14, No. 8, pp. 2407–08, January, 1972. The bar code data are encoded in the six spaces between the seven vertical lines of a bar code. A unit distance between vertical lines corresponds to a logic zero, and a two unit distance corresponds to a logic one. The bar code character set is constrained so that the first space of each code is always a logic zero. In operation, the reader first measures the time spent reading the first unit space. Velocity variation is then controlled by measuring the read time of each subsequent digit and comparing it to that of the previous digit. If it is substantially equal to the first space read time, the second space read time is recognized as a logic zero and is then stored for comparison to the third space read time. If it is substantially longer than the first space read time, the second space read time is recognized as a logic one, divided in half, and stored for comparison to the third space read time. This cycle of reading a space and updating the reference time is repeated until the bar code is completely read. Although the IBM system is effective in certain applications, it is inapplicable when the character set is not constrained by known data at the beginning of each string. Furthermore, such a system cannot track the position of the sensor over uniform character data, such as all black or all white.

One optical text scanning system has recently been proposed as an adjunct to word processing systems to facilitate input of textual data into the memory of a computer. Such system is the Omni-Reader marketed by Oberon International. In the Omni-Reader, a page of text, printed in one of four standard type faces, is mounted on a scanning platform. A scanning head, mounted on a specially engineered guide rule, is moved manually over the text to convert the text into machine-readable form. Such system employs a single optical sensor and associated circuitry to sense a repeated, asymmetric pattern of dots and dashes on the guide rule, thereby to detect movement and scanning direction of the scanning head along the guide rule and to synchronize data acquisition with movement. Precise alignment of the text with the guide rule is required for proper operation. The Omni-Reader is, however, unable reliably to recognize dot matrx, newsprint, letterhead, graphics, foreign language, and handwritten materials.

U.S. Pat. No. 3,947,817 to Requa, deceased et al. shows an optical data reader for point-of-sale terminals which uses a two-dimensional self-scanned photodiode array in a hand-held scanning unit. The size of the array is chosen and the device is operated so that an entire character is scanned at one time. The constrained character set used on the inventory tags obviates the need to determine the relative spacing of the characters or to note the presence of blank areas.

U.S. Pat. No. 4,118,687 to McWaters et al. shows a portable optical character recognition system using a two-dimensional array of optical sensors. The optical sensors are described in the above Requa, deceased et al. patent. The disclosure of McWaters et al. is directed to the system's internal editing and formating functions, such as ignoring spaces in the text. U.S. Pat. No. 4,072,859 to McWaters discloses a control circuit to automatically remove power from the recognition circuits of the optical character recognition system when the hand-held scanner is not being used.

U.S. Pat. No. 3,713,100 to Hemstreet shows an optical character recognition system which compares the scanned data with a stored set of character data to identify the character being scanned. U.S. Pat. No. 3,713,099 to Hemstreet describes the conversion of scanned data into parallel form and its comparison with symbolic reference data. A comparison yields an analog output signal indicative of the degree of match.

U.S. Pat. No. 3,496,363 to Rome shows the use of nonparallel arrays of light-responsive elements in a scanner for tracking the position of a star in the sky.

None of the foregoing devices is capable of reliable, hand-held operation to scan unconstrained optical data and input such data into a computer as they are being scanned.

Accordingly, a need remains for an optical character reader which can operate manually at irregular speeds and with imperfect alignment, reliably to scan alphanumeric, graphic, and other optical data of any kind.

SUMMARY OF THE INVENTION

One object of the present invention is to provide an economical hand-held scanner for optically sensing a pattern on a surface.

Another object of the present invention is to provide a reliable method and scanning apparatus for asynchronously scanning unconstrained data patterns, such as typewritten text.

A further object of the present invention is to provide a hand-held scanning unit that can be used at irregular speeds and without precise alignment, yet accurately record optical information from scanned optical data.

Yet another object of the present invention is to provide an optical scanning unit for use with an unconstrained set of optical data.

The preferred embodiments of the optical scanning unit of the present invention operate asynchronously by electro-optically detecting movement of a scanning unit directly from the data being scanned.

A first preferred method of operation includes projecting plural first imaging elements along a character-imaging line onto a surface containing an optical data pattern and projecting at least two second imaging elements onto the surface alongside the line of first imaging elements. A user moves the first and second imaging elements across the pattern laterally in a scanning direction generally normal to the character-imaging line, and electronic circuitry senses the optical states of the second imaging elements to detect a change in optical state which change corresponds to relative movement between the second imaging elements and the pattern. The occurrence of relative movement in the scanning direction can be detected by first detecting a pattern in a first subset of the second imaging elements and then sensing a shift of the detected pattern to a second subset of such elements toward a trailing end of the set of the second imaging elements.

In response to detecting a unit increment of movement, electronic circuitry senses the optical states of the first imaging elements to detect a portion of the pattern along the character-imaging line. The response to detection of such relative movement can be directly or instantaneously triggered, but in this embodiment is preferably triggered indirectly by calculating an average rate of relative movement and triggering each sensing of the first imaging elements at periodic intervals corresponding to the calculated average rate of relative movement. Upon detection of a uniform optical state of the second imaging elements, such as when scanning across a blank region in the pattern, sensing of the optical state of the first imaging elements is triggered at such periodic intervals so long as said uniform state continues to be detected. The optical information is thus obtained in a succession of steps and is assembled by the host computer.

The host computer may use and execute character recognition procedures on the acquired composite optical information, or merely use such information in its raw form if it represents graphical or architectural data. The use of an integral motion detection system obviates the need for a uniform scanning rate, yet accurately reproduces spacing and distances in two dimensions directly from the pattern being scanned.

A second preferred method of operation differs from the first preferred method in that the former uses a rectangular array of imaging elements arranged in rows and columns and calculates an estimate of the instantaneous rate relative movement. Each of the rows of imaging elements is aligned parallel to the scanning direction and changes optical states in a manner analogous to that of the line of second imaging elements described above. The second preferred method promotes increased accuracy during collection of optical information for situations in which the scanning direction is misaligned from the optical information and the scanning velocity is nonuniform.

The foregoing objects, features, and advantages of the present invention will be more readily apparent from the following detailed description of preferred embodiments thereof which proceeds with reference to the accompanying drawings.

BRIEF DESCRIPTION OF DRAWINGS

FIG. 7 is a schematic of the optical imaging elements and associated multiplexing circuitry of the first preferred embodiment, illustrating concurrent sensing of optical data by both lines of sensors.

FIG. 8 is an enlarged plan view of the optical imaging elements the second preferred embodiment of the device of FIG. 1.

FIG. 11 is a timing diagram showing the timing relationships of certain signals processed by and developed in the motion detection circuitry of FIGS. 10A and 10B.

DETAILED DESCRIPTION OF PREFERRED EMBODIMENTS

Figure 1:
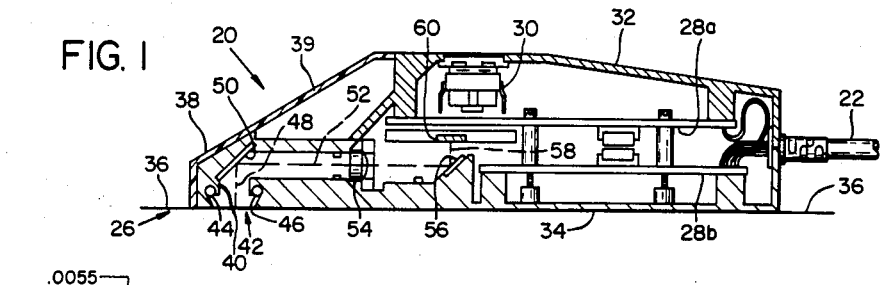
FIG. 1 is a cross-sectional view of a hand-held optical character-reading device according to the invention, showing the arrangement of the optical elements of the device.

Referring to FIG. 1, the first and second preferred embodiments of the invention employs a hand-held scanning device or "mouse" 20. This scanning device is connected by power, clock and serial data lines 22 to processing circuitry 24 (FIG. 4) on an electronic interface card in a host computer, such as an IBM PC or other personal microcomputer (not shown). Scanning device 20 includes a housing for an optical scanning system 26, a pair of circuit boards 28a, 28b supporting circuit 28 (FIG. 4), and a manually actuable push button switch or read key 30. The housing is divided into interlocking upper and lower casing halves 32 and 34, respectively. Upper casing half 32 is sized and shaped to fit comfortably within a user's hand, and read key 30 is centered in the top of the casing for convenient operation by the user's index finger. Lower casing half 34 has a flat bottom for smoothly interfacing with a flat surface 36, such as a sheet of paper bearing an optical data pattern. Circuit boards 28a and 28b are stacked in spaced parallel relationship and mounted in lower casing half 34. The casing has at its front end a narrow nose portion 38 which is covered by a transparent shell 39, so that the user can view the optical data along each side of nose portion 38.

The optical system 26 includes within nose portion 38 a vertical channel 40 which extends to an opening 42 in the plane of the bottom wall of lower casing 34. A pair of white lights 44, 46 are mounted on opposite walls of channel 40 just above opening 42 for illuminating a pattern on surface 36. Light from the lamps is reflected from the surface and modulated by the pattern on the surface. Light reflected upwardly traverses a vertical path 48 to a front-silvered mirror 50 positioned at a 45° angle to reflect the light rearwardly along line 52 within the casing. The light passes through an achromatic lens 54 to a second front-silvered mirror 56 positioned anti-parallel to mirror 50 so as to reflect the light upward along line 58 to a photodiode array 60 of the first embodiment or photodiode array 202 of the second embodiment.

Figure 2:
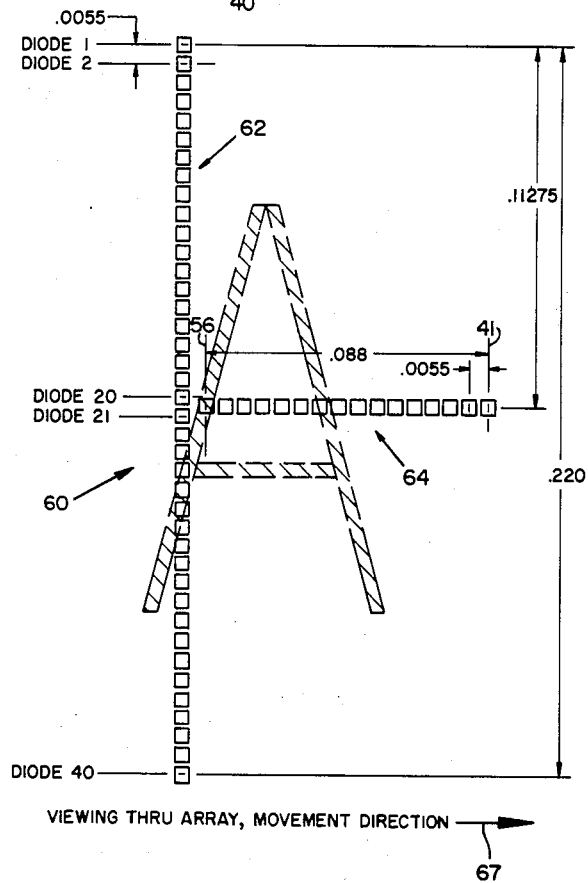
FIG. 2 is an enlarged plan view of the optical imaging elements in the first preferred embodiment of the device of FIG. 1, projected onto exemplary optical data.
Figure 3:
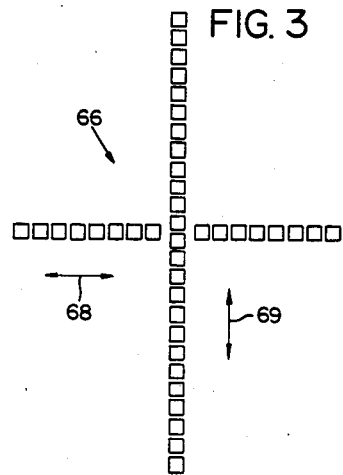
FIG. 3 is a plan view of an alternate form of the imaging element array of FIG. 2.

Referring to FIG. 2, the photodiode array 60 of the first embodiment includes a character-image line of diodes 62 and a movement sensor line of diodes 64. The two lines of diodes are preferably oriented at right angles, with the movement sensor line of diodes 64 centered between the ends of the character-image line of diodes, to form a T-shaped array. The lines of diodes are oriented so that the character-image line 62 is normal to the scanning direction, indicated by arrow 67, and the movement sensor line 64 extends in the scanning direction from the character-image line. Alternatively, for two-directional scanning, a "+"-shaped array as shown in FIG. 3 can be used. Other orientations of the character-image and movement sensor lines can be used, depending on the application. For ease of manufacture, a rectangular photodiode array can be employed, with the unused diodes being masked either in the array output circuitry or in processing software. A charge-couple device (CCD) may be substituted for the photodiode array. In the first preferred embodiment, a custom, T-shaped photodiode is used, eliminating the need to tailor the scanning pattern by hardware or software.

The photodiode array is sized so that character-image line 62 of photodiodes fully encompasses the optical data patterns expected to be scanned by the device. FIG. 2 illustrates a 12 pitch gothic type letter "A" as viewed through the optical array. Lens 54 and the distances along lines 48, 52, 58 are dimensioned to provide a 1:1.3 relationship between the pattern being scanned and the image at the photodiode array. Accordingly, FIG. 2 is a projection, to scale, of imaging elements defined by the photodiode array, onto surface 36 over the character A. The photodiodes and optical system are sized and spaced to provide a resolution roughly corresponding to that of the human eye. A suitable unit spacing for the diodes is 0.0055" center to center. Forty diodes are used in the character-image line, and 16 diodes are used in the movement sensor line.

Figure 4:
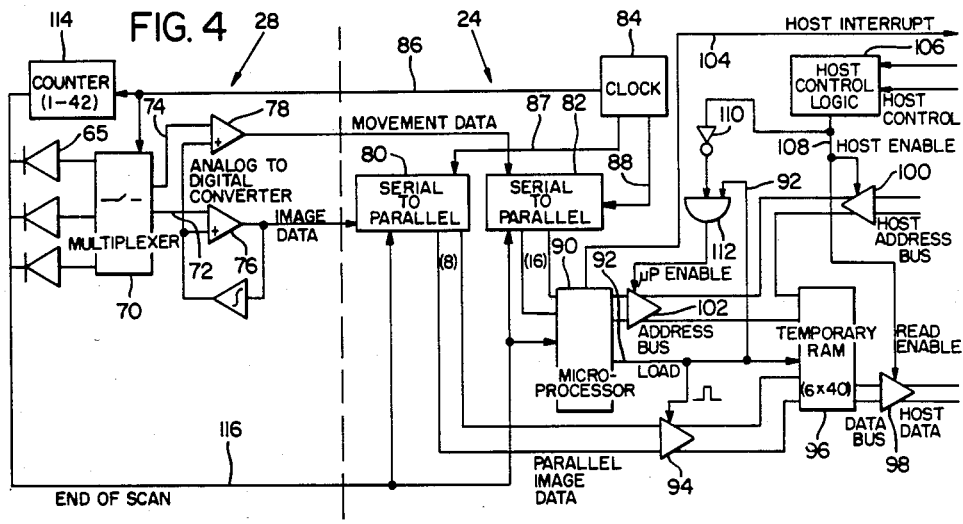
FIG. 4 is a block diagram of the electronic signal processing circuitry used in the first preferred embodiment of the device of FIG. 1, together with interface circuitry for connecting the device to a host computer.

Referring to FIG. 4, the photodiode array 65 is symbolically shown using the conventional diode symbol. For simplicity, only three photodiodes are shown, with the understanding that they represent the entire 56-diode array shown in FIG. 2. The outputs of the photodiode array are applied to the inputs of a multiplexer 70, shown in further detail in FIG. 7. The multiplexer has two analog outputs, an output line 72 for analog image data from character sensor line 62 and an output line 74 for analog movement data from movement sensor line 64.

For use of scanning device 20 to scan typewritten text or other black and white data patterns, the image and movement sensor outputs are digitized, by analog-to-digital converters 76, 78, respectively, into binary quantities, with a logic 0 representing light and a logic 1 representing dark. The binary image and movement data are input to serial-to-parallel converters 80, 82, respectively.

As explained hereinafter, operation of the multiplexer and serial-to-parallel converters is controlled by a clock 84 through clock lines 86, 87, 88. During each clock cycle on line 86, two diodes in the photodiode array are scanned, one in the character-image line 62 and one in the movement sensor line 64, as illustrated in FIG. 7. Two separate multiplexer sections 70a, 70b are provided, one connected to each line of photodiodes, for performing this parallel multiplexing function.

The image data serial-to-parallel converter 80 is an 8-bit converter and movement data converter 82 is a 16-bit converter. The 16 parallel output lines from converter 82 are connected to a microprocessor 90 which is programmed, as discussed hereinafter, to detect movement of the optical data pattern along the line-of-movement sensor photodiodes and to provide an output signal corresponding to such movement.

The eight output lines from the image data serial-to-parallel converter 80 are applied, under control of a load signal from the microcomputer on line 92 and through gates 94, to the inputs of a temporary random access memory 96. The temporary RAM is sized to accumulate a plural slices of image data, for example, six slices of 40 bits each. RAM 96 has an 8-bit parallel output bus connected through an array of gates 98 to the data inputs of the host computer (not shown).

The interface circuit 24 includes a host computer address bus, which is connected through a first array of address gates 100 to the temporary RAM to the microprocessor. A secondary array of address gates 102 is provided in the address bus between the microprocessor and the temporary RAM. The microprocessor has an output signal line 104 for transmitting a host interrupt signal to the host computer. The host computer in turn has a set of parallel host control signal lines connected to a host control logic subcircuit 106. The host control logic has, as an output, a host enable signal line 108, which controls operation of gates 98, 100, 102. The host enable signal is input to gate 102 through an inverter 110 and an AND gate 112. The AND gate has, as a second input, the movement signal which appears on signal line 92.

Figure 5:
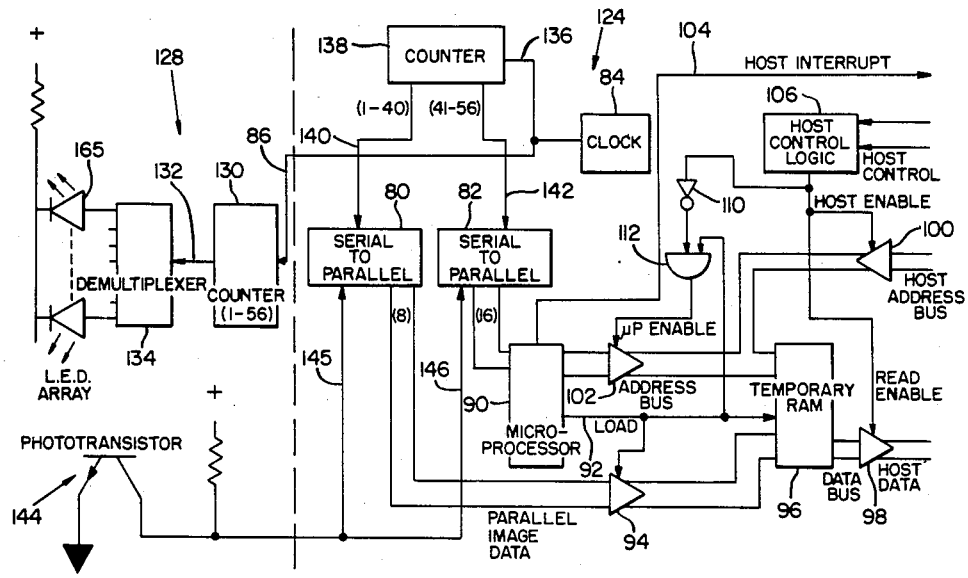
FIG. 5 is a block diagram similar to FIG. 4, showing an alternate form of optical system and associated electrical circuitry, utilizing a single photodiode and a plurality of collimated light sources to form the array of imaging elements.

Referring to FIG. 5, an alternative form 128 of the optical system 26 and associated circuitry reverses the relative positions of the light sources and sensors. Instead of photodiode sensors, the imaging array 62, 64 can be formed by an array of light-emitting diodes 165, arranged as in FIGS. 2 or 3. Instead of lamps 44, 46, a phototransistor 144 is used to detect light emitted by the LEDs and reflected back from surface 36. Interface circuit 124 is substantially the same as circuit 24 and like parts are numbered using the same reference numerals as in circuit 24.

Circuit 128, which controls operation of the light-emitting diodes, includes a counter 130 connected to signal line 86 from clock 84. The counter provides an output count corresponding to the number of imaging elements in the array, for example, from 1 to 56. The output count is transmitted via signal line 132 to a demultiplexer 134, which turns each successively-numbered light-emitting diode on and off in turn. As each LED is turned on, it projects light parallel to the path of lines 58, 52, 48 (FIG. 1) onto surface 36, illuminating the point imaged by its respectively-numbered imaging element in lines 62, 64 (FIG. 2). The clock signal from clock 84 is also input via line 136 to a second counter 138 which has two output lines, 140, 142. On line 140, the counter provides a count equal to the number of imaging elements in the image data array (e.g., 40) to serial-to-parallel converter 80. The count is continued on output line 142 for the number of imaging elements in line 64 (e.g., 16), to control serial-to-parallel converter 82. Each increment of the count on line 140 inputs a bit of data via line 145, which corresponds to the signal received by phototransistor 144. If the illuminated imaging element is light, a logic 0 is input into the like numbered location of converter 80, 82. If such imaging element is dark, a logic 1 is input to the corresponding location in the converters, as controlled by counter 138. The operation of the circuit of FIG. 5 is otherwise substantially the same as that of FIG. 4.

With reference to FIG. 4, the clock 84 provides a 2.5 MHz signal that is divided by sixteen to provide a 156.25 KHz clock to the photodiode array multiplexer 70. During each clock cycle, two diodes of photodiode array 65 are scanned by the multiplexer, as discussed below with reference to FIG. 7. The entire scanning of the photodiode array takes 42 clock cycles, 40 cycles for the photodiodes themselves, and 2 cycles at the end of the scan for the capacitors of the charge-coupled array to recharge (in effect, a vertical retrace period). Thus, each scan of the photodiode array produces two streams of 42 bits to the two serial-to-parallel converters. The character-image serial-to-parallel converter 80 receives a string of 40 data bits followed by 2 vertical retrace bits (X) (FIG. 7). Serial-to-parallel converter 80 masks the 2 retrace bits and provides to gate 94 a parallel output containing the 40 data bits in five 8-bit bytes.

The 42 bit data string fed to the position detector serial-to-parallel converter 82 contains, at its beginning, 16 bits corresponding to the 16 motion-detecting photodiodes. Following this string are 24 dummy bits (Y) (FIG. 7), inserted in the string to compensate for the difference between the character sensing array of 40 elements and the motion sensing array of 16 elements. Again, the 42 bit data string includes 2 dummy bits at the end corresponding to the vertical retrace. The output of motion-sensing serial-to-parallel converter 82 is a single, 16-bit word corresponding to the 16 motion-sensing photodiodes.

The scanning system is designed to operate at a maximum scanning speed of 4 inches per second. At speeds above this rate, it would be difficult manually to maintain the scanning mouse over the single line of text. The resolution of the system is 180 dots per inch. The entire array is scanned in about 268 microseconds (42 cycles at 156.25 kilohertz) and the rate of scanning (column rate) is 1.4 milliseconds per column of data (4 inches per second at 180 columns per inch). Consequently, the system typically scans the character-sensing photodiodes at least five times before it senses a change in the state of the motion-sensing diodes due to relative motion. The repetitive scanning of the same column of data allows the processor periodically to perform other functions, such as transferring data to the host computer, without missing relevant motion data.

The microprocessor, a Motorola MC146805E2, has a 1 MHz internal instruction frequency, which is internally generated from an external 5 MHz crystal. The microprocessor is programmed, in accordance with the flowcharts described later, to detect increments of movement as sensed by the position sensing photodiode array. The microprocessor intermittently issues a load signal on line 92, at intervals corresponding to the detection of movement, to enable gates 94. Gates 94 cause the transfer of data from the output of character-image serial-to-parallel converter 80 to the temporary RAM storage 96. These 40 data bits are transferred, five 8-bit bytes at a time, into the location in RAM presently accessed by a memory pointer. Thus, the first column of character data would be stored in bytes 0 through 4 of the RAM, the second column in bytes 5 through 9, et cetera.

The character data stored in the temporary RAM are transferred to the host computer upon one of two conditions. The first is that the operator removes his finger from the read key, indicating that the end of a line has been read. The second is when 6 columns of data (thirty 8-bit bytes) have been stored in the RAM. This number is selected to optimize efficiency of the system. If data are transferred more frequently, the host processor requires more time to exchange information with the mouse. If the data are transferred less frequently, more of such data must be transferred at each time, necessitating a longer interruption by the microprocessor of its usual motion detecting function. Such a longer interruption may cause the processor to miss a movement. Transferring data from the temporary RAM to the host computer every 6 columns appears to be an acceptable compromise between the countervailing considerations.

Figure 6:
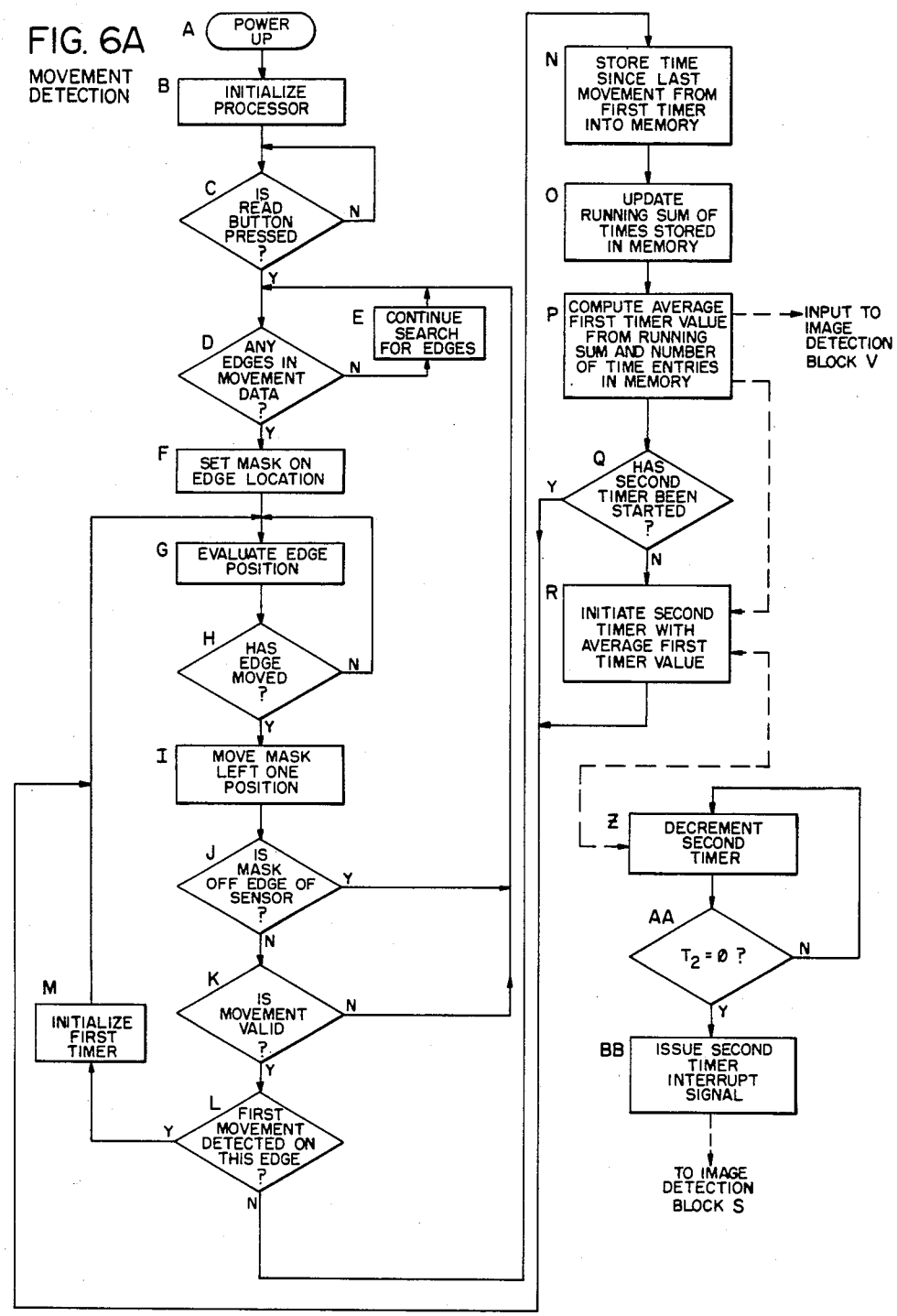
FIGS. 6A and 6B are flowcharts of operation of the device of FIGS. 1-5 according to the invention.

As discussed above, the digitization of the image data by the vertical column of image sensors is controlled by the movement of data along the row of motion-detecting sensors. The flowcharts of FIGS. 6A and 6B illustrate the procedure used to coordinate digitization of image data with motion of the mouse. The overall effect of the procedure is to determine an average interval between detected changes in the horizontal data and to periodically digitize the image data in accordance with this average interval.

With reference to FIG. 6A, the system is first energized and the processor is initialized (blocks A, B). When the read button on the mouse is depressed (block C), the microprocessor enters into a subroutine that searches for an edge in the array of horizontal position data (blocks D, E). Since the read button is typically first depressed in the left-hand blank margin of a page of typed information, the data elements in the horizontal position sensors (underlined in the chart) typically are uniform in value, as shown in line (a) of the following chart. (The chart illustrates a hypothetical set of position detector data at a variety of steps in the procedure.) This uniform value is typically an array of logic zeros, since the illuminated area is uniformly white. In this condition, the subroutine loops indefinitely until the mouse is advanced sufficiently so that an edge enters the horizontal array. This edge typically takes the form of a pair of bits, "01," indicating the beginning of a dark character on the light background, as shown in line (b) of the chart. The edge could also be a "10," corresponding to the end of a dark character on a light background.

chart). Since the "01" edge presently masked is identical to the 01 edge being tracked, the system again validates the move.

The system next performs several crucial steps in the process: it reads the time from the timer, stores the time in a circular buffer, updates a running sum of the times stored in the buffer, and computes the average value of

| STEPS | POSITION DETECTOR DATA |
| --- | --- |
| (a) A, B, C, D, E, D... | 0 0 0 0 0 0 0 0 0 0 0 0 0 0 0 0 1 1 0 1 1 0 |
| (b) D, F, G, H, G... | 0 0 0 0 0 0 0 0 0 0 0 0 0 0 0(0 1)1 0 1 1 0 1 |
| (c) H | 0 0 0 0 0 0 0 0 0 0 0 0 0 0 0(1 1)0 1 1 0 1 1 |
| (d) I, J, K, L, M, G, H, G... | 0 0 0 0 0 0 0 0 0 0 0 0 0 0 0(0 1)1 0 1 1 0 1 1 |
| (e) H | 0 0 0 0 0 0 0 0 0 0 0 0 0 0 0(1 1)0 1 1 0 1 1 0 |
| (f) I, J, K, L, N, O, P, Q, R, G, H, G... | 0 0 0 0 0 0 0 0 0 0 0 0 0 0(0 1)1 0 1 1 0 1 1 0 |
| (g) H | 0 0 0 0 0 0 0 0 0 0 0 0 0 0(1 1)0 1 1 0 1 1 0 1 |
| (h) I, J, K, L, N, O, P, Q, G, H, G... | 0 0 0 0 0 0 0 0 0 0 0 0 0 0(0 1)1 0 1 1 0 1 1 0 1 |
| (i) H | 0 0 0 0 0 0 0 0 0 0 0 0 0 0 0(1 1)1 0 1 1 0 1 1 0 1 |
| (j) I, J, K | 0 0 0 0 0 0 0 0 0 0 0 0 0 0(1 1)1 1 0 1 1 0 1 1 0 1 |
| (k) D, E | 0 0 0 0 0 0 0 0 0 0 0 0 0 0 0 1 1(0 1)1 0 1 1 0 1 |

When the system detects an edge in the movement data, it aligns a two-bit mask over the edge location (block F, FIG. 6A; the mask is indicated by the parenthesis on line (b) of the preceding chart). The mask serves as a window through which the system evaluates a selected pair of bits in the array of horizontal sensor elements. When the mask is positioned over the edge ("01" here), the system evaluates the edge to detect any change (blocks G, H, FIG. 6A). The system loops indefinitely until it detects a change within the masked bits of the array.

When the mouse is advanced sufficiently to the right, the masked bits of the horizontal sensor array will change in accordance with the movement, as shown in line (c) of chart. When the masked bits have changed, the mask is moved left to the adjoining position and the procedure checks to see whether part of the mask is off the edge of the sensor array (blocks I, J, FIG. 6A). In the illustrated example, the mask, after being shifted left one position, is still within the array of 16 sensors, so the procedure then inquires whether the detected movement was valid. It determines this by comparing the two presently-masked bits with the edge that is being tracked. If the compared pairs of bits are equal, the processor validates the movement. If not, the system proceeds as described hereinafter.

Once the system detects the presence of a first valid movement (block L), it initializes a first counter to time the interval until the next movement (block M, FIG. 6A). The system then monitors the newly validated edge within the mask, waiting for it to move again (blocks G and H, FIG. 6A; line (d) in chart). When it detects a change within these masked bits (block H, FIG. 6A; line (e) in chart), the system again moves the mask left one position, checks whether the mask is off the edge of the horizontal sensor array, and determines whether the newly masked bits conform with the previously masked edge (blocks I, J, K, FIG. 6A; line (f) in the times read (blocks N, 0, P, FIG. 6A).

Now, for the first time, the system has an average movement interval that can be used to set the sampling rate of the image sensors. The sampling of the image sensors is controlled by a second timer. This timer is loaded with the average time interval computed above and proceeds to count down to 0. When the second timer reaches 0, it issues an interrupt signal to the processor, indicating that a column of image data is to be read from the image sensor's serial-to-parallel converter and transferred to the temporary RAM. This process is shown in blocks Q, R, Z, AA and BB of FIG. 6A and in FIG. 6B.

Since, in the illustrated example, the digitization, or second, timer, has not yet been initialized, it is loaded with the average time interval computed above and is started. In subsequent loops through this flowchart, however, the digitization timer is not restarted; once started, it operates independently of the motion-sensing procedure. Its only continuing relation to the motion-sensing procedure is that it counts down from the average time interval last computed by blocks N, 0 and P. This average time interval is loaded into the second timer each time it times out (block V, FIG. 6B).

The effect of the interrupt signal of the second timer is shown in further detail in FIG. 6B. In the image-detection section of the procedure, the processor remains constantly alert for the occurrence of the second timer's interrupt signal. When it detects this interrupt signal, the processor immediately interrupts the movement detection process. The processor saves the column of vertical image data, taken from the image data serial-to-parallel converter, in the random access memory. The processor then reloads the second timer with the average time interval last computed in the motion detection process. The second timer immediately begins continuously decrementing, as described above.

The data stored in the temporary RAM, to which the image data is sent, must periodically be transferred to the host computer. In the first preferred embodiment, these data are transferred after six columns, or slices, of image data have been stored (blocks W and X, FIG. 6B). Each slice contains five 8-bit bytes; therefore, the first preferred embodiment transfers image data from the RAM after 30 bytes of data have been stored. Once the image data have been transferred to the host computer, the movement detection process resumes (block Y).

Resuming the illustrated example, the procedure shown in FIG. 6A repeatedly searches for movements in the edge and measures the intervening time interval accordingly. Continued movement of the mouse from the position shown in line (f) of the chart causes the masked bits to change again to a "11" state (line g) of chart). When the mask is shifted left again, the "01" edge is again found (line h) of chart) and the movement is validated.

Occasionally, an invalid move will be found (block K). This can happen when the edge of the printed character is noisy, or if the operator has skewed the mouse vertically off the text. Such a case is shown in lines (i) and (j) of the chart. The "01" edge that had previously been within the mask changes in line (i) to "11." In accordance with the new procedure, the mask is shifted to the left and the new contents checked for the presence of the "01" edge. In this instance, shown on line (j), a "11" is found within the newly masked bits. This indicates that the "01" edge did not make a valid move. In this case, the procedure immediately searches for a new edge to track (blocks K, D, E, FIG. 6A; line (k) in chart).

Since there is considerable computational overhead involved in setting the timer and acquiring the first time interval upon locating a new edge, it is desirable to do this as infrequently as possible. Accordingly, it is desirable to track edges from their right-most position, so that they may advance through 14 movements before a new edge must be located. Thus, in the FIG. 2 embodiment, the search for new edges always begins at the right, or leading end of the position sensing array.

When an edge has been successfully tracked across the entire array, it will, at the end, advance off the edge of the array. This is detected by block J of the procedure, and causes the system to search for a new edge to track.

In the first preferred embodiment, at the beginning of a scan, an average movement interval is not determined until an edge has been located and moved twice. None of the image data is lost during these steps, however, since the position sensors extend a considerable distance ahead of the vertical row of image sensors. An advantage of this embodiment is that the host computer is not filled with repetitive columns of blank data in the left-hand margin, regardless of how far to the left of the line operation of the mouse is begun. The system does not begin recording image data until optical information has moved within the field of the position sensor array. Alternatively, particularly if a shorter position sensor array is used as shown in FIG. 3, an assumed rate of average movement can be initially stored.

Once the first column of image data has been recorded, columns of blank space are recorded accurately by the system. The digitization timer, once loaded with the average movement interval, constantly samples the vertical image data at a rate determined by the most recently computed time interval between detected movements. When the mouse is moved over blank areas, no movements are detected, so no new time intervals are added to the buffer of time values. Accordingly, the average time interval, and the digitization rate, remain constant.

In the first preferred embodiment, the buffer containing the measured time intervals is 8 bytes long. Each newly measured time is stored in a time the array and, if there are already 8 time intervals stored in the time array, the eighth, which is the oldest, is dropped off and the running sum is updated. In this way, the average time interval always reflects the most recently measured time intervals.

The "+"-shaped array of FIG. 3 can also be used in combination with a printed grid pattern as a position control mouse, e.g., to control a display cursor. For such use, the procedure of FIG. 6A, blocks A to K, is applied to both the vertical and horizontal lines of sensors. Initially, one direction of movement is assumed, but if the procedure detects an invalid movement, the opposite direction of movement is tested before continuing to search for edges. Once the correct directions of movement are found in each array, the instantaneously-detected movements control the cursor.

The motion detection method described above for photodiode array 60 (FIG. 2) and photodiode array 66 (FIG. 3), of which both employ one movement sensor line of diodes, entails the calculation of an average movement interval (i.e., an estimated average scanning speed) to set the sampling rate of the image sensors. For certain characters, however, using one movement sensor line of diodes can be less effective in providing information from which the system can calculate an average movement interval. This would occur, for example, whenever the leading end of the sensor line of diodes is skewed or offset so that such leading end first encounters the apex of a concave portion of the numeral "3." Under such circumstances, the character-image line of diodes could pass a portion of the numeral "3" before the system completes a calculation of an average movement interval, which specifies the image sampling rate. This could result in image data not being sampled by the image sensors. The calculation of the average movement interval must, therefore, be completed before the character-image line of diodes passes part of the image that is to be sampled.

Moreover, calculating an average movement interval corresponding to an estimated average scanning speed could make the system susceptible to under-sampling of image data. This could occur, for example, whenever a user operates the mouse with a "palsied" hand, thereby providing a nonuniform scanning speed that could cause acquisition of less than the amount of the data necessary to recognize the image character.

FIGS. 8-11 together with the following description are directed to a second embodiment 200 of an optical character reader that is less susceptible to the above problems. Second embodiment 200 substitutes a rectangular array 202 of photodiodes for either photodiode array 60 or photodiode array 66 in optical system 26 and employs a motion detection method that provides an estimate of the instantaneous scanning speed of mouse 20.

Referring to FIG. 8, second embodiment 200 employs a rectangular array 202 of normally identical photodiodes mutually spaced apart by a predetermined distance. Array 202 preferably includes 560 active photodiodes arranged in forty rows 204 and fourteen columns 206. Rows 204 are parallel to scanning direction 67. Array 202 is sized so that columns 206 of the photodiodes fully span the optical data patterns expected to be scanned by mouse 20. Array 202 can be, for example, a Model No. RA1441A photodiode array manufactured by EG&G Reticon Corporation of Sunnyvale, Calif. As will be discussed further below, characterimage line of diodes 62 and movement sensor line of diodes 64 described with reference to FIG. 2 correspond to, respectively, column 8 of array 202 and each of the rows 1 through 40 of array 202. Optical scanning system 26 is otherwise the same as that described above with reference to FIG. 1.

Figure 9A:
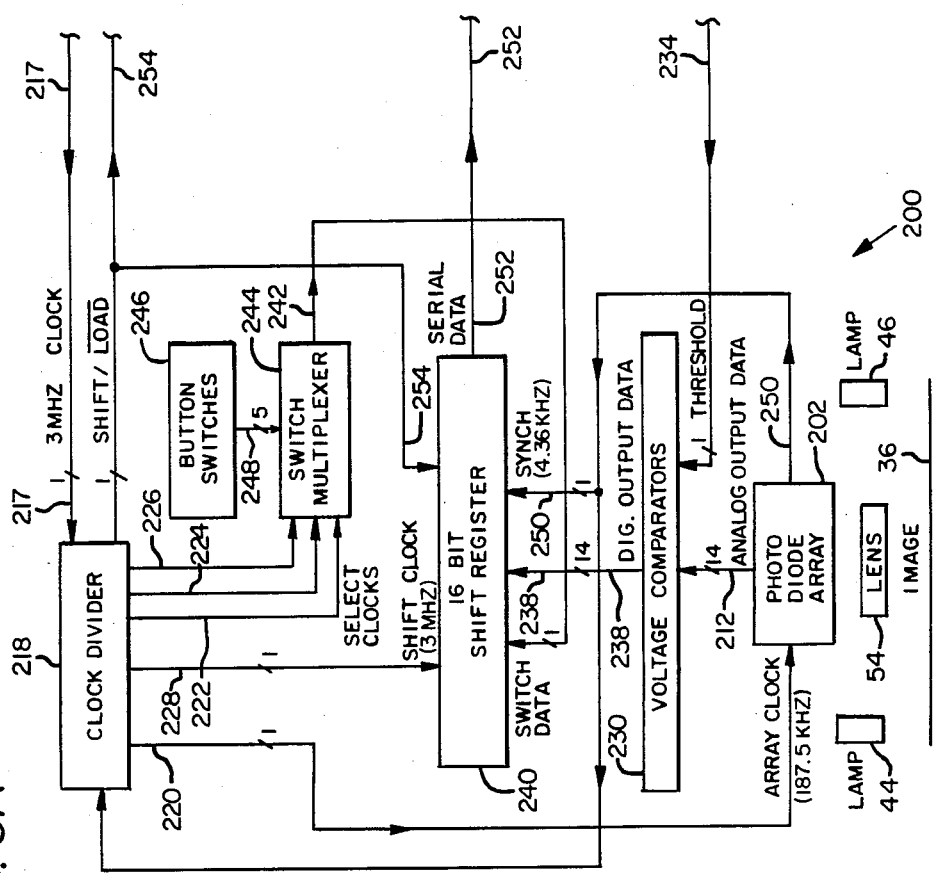
FIGS. 9A and 9B show a block diagram of the electronic signal processing circuitry used in the second preferred embodiment of the device of FIG 1, together with interface circuitry for connecting the device to a host computer.
Figure 9B:
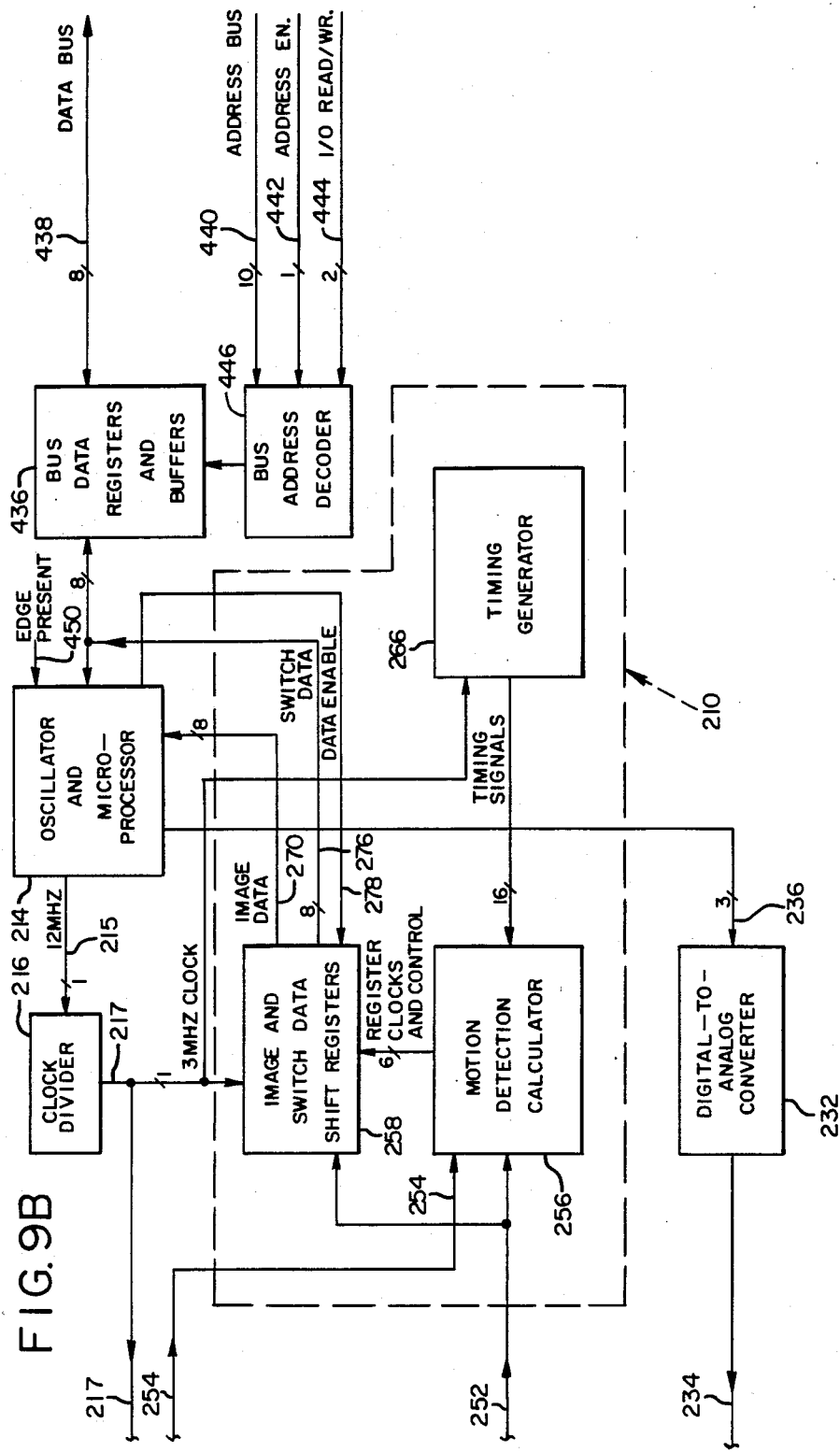

Referring to FIGS. 9A and 9B, second embodiment 200 of the optical scanning unit samples image data at a rate determined in accordance with a technique that processes edge data to estimate the instantaneous speed of mouse 20 as it moves across the surface containing the optical data. Second embodiment 200 can operate at scanning speeds from zero to ten inches per second. To estimate the instantaneous speed of mouse 20, a motion detection circuit 210 processes the output data corresponding to the optical data on the surface. Second embodiment 200 repetitively reads out the output data of array 202 in row-by-row fashion and delivers such data to motion detection circuit 210, which processes the data in the manner described below.

Array 202 receives a 187.5 KHz ARRAY CLOCK signal that causes output data for a different row 204 to appear on fourteen output conductors 212 of array 202 every 5.33 microseconds (i.e., one period of the 187.5 KHz ARRAY CLOCK). The 187.5 KHz ARRAY CLOCK is derived by frequency division of a 12 MHz standard clock signal developed by an oscillator and microprocessor module 214 on an output 215. A clock divider 216 receives the 12 MHz clock and divides it by four to produce on an output 217 a 3 MHZ clock, which is used by motion detection circuit 210 as the standard clock frequency for determining the instantaneous scanning speed of mouse 20. A clock divider module 218 receives and further subdivides the frequency of the 3 MHz clock to produce a number of synchronous output clock signals of different frequencies. Clock divider module 218 provides the 187.5 KHz ARRAY CLOCK, a 93.75 KHz clock, 46.875 KHz clock, and 23.4375 KHz clock on outputs 220, 222, 224, and 226, respectively. Clock divider module 218 also provides a buffered 3 MHz SHIFT CLOCK on an output 228.

During each 5.33 microsecond period of the ARRAY CLOCK, array 202 presents on the fourteen output conductors 212 analog voltage output data stored in the column positions of one of the rows 204 of photodiodes. A voltage comparator module 230 receives and compares the analog output data appearing on the output conductors 212 of array 202 against a DC threshold voltage. Voltage comparator module 230 digitizes the analog voltage output data appearing on output conductors 212 of photodiode array 202.

Oscillator and microprocessor module 214 provides on three output conductors 236 a 3-parallel bit digital word that is applied to a digital-to-analog converter 232, which develops on its output 234 an adjustable voltage component of the DC threshold voltage. The DC threshold voltage represents the sum of a fixed voltage component internally set in voltage comparator module 230 and the adjustable voltage component provided by digital-to-analog converter 232. By adjusting the DC threshold voltage above or below the fixed voltage component, the user can adapt second embodiment 200 to read optical data appearing on either light or dark surfaces. The optical character reader automatically adjusts the DC threshold voltage in accordance with a background recognition algorithm implemented in software in the host computer. Whenever an analog voltage output datum appearing on any one of the fourteen output conductors 212 is greater than the DC threshold voltage (i.e., represents a white image), voltage comparator module 230 provides on a corresponding one of its fourteen output conductors 238 a logic 1 state. Whenever an analog voltage output datum appearing on any one of the fourteen output conductors 212 is less than the DC threshold voltage, (i.e., represents a black image), voltage comparator module 230 provides on a corresponding one of its fourteen output conductors 238 a logic 0 state.

The fourteen output conductors 238 of voltage comparator module 230 deliver digitized output data for each row 204 of array 202 to a 16-bit parallel-to-serial shift register 240. Shift register 240 also receives a switch status bit from an output 242 of a switch multiplexer 244 and a synchronization status bit from an output 250 of array 202. Each one of rows 204 has, therefore, sixteen bits associated with it. The sixteen bits of each frame are arranged so that bit positions 1 through 14 contain the fourteen image data bits, bit position 15 contains the switch status bit, and bit position 16 contains the synchronization status bit. Bit position 1 and bit position 14 represent the output data of column 1 and column 14, respectively. The sixteen bits of each frame are clocked out of shift register 240 in descending bit position order. A complete scan of the data in array 202 requires 43 frames, with frame 1 representing the output data in row 1 and frame 40 representing the output data in row 40. Frames 41, 42, and 43 represent three data readout time intervals, of which each is 5.33 microseconds in duration. (Although they do not provide image data, frames 41, 42, and 43 are sometimes referred to as rows 41, 42, and 43, respectively, for convenience only.) The data in frames 41 and 42 are unused, and the synchronization status bit is in a logic 1 state for frame 43 and in a logic 0 state for all other frames in a scan. The time required to complete one scan of array 202 equals 229.3 microseconds, which represents 43 times the 5.33 microsecond period of the ARRAY CLOCK. Switch multiplexer 244 receives the 93.75 KHz, 46.875 KHz, and 23.4375 KHz clocks appearing on the respective outputs 222, 224, and 226 of clock divider module 218 and provides a selected one of the status bits corresponding to five button switches 246 on mouse 20. The five button switches 246 include read key 30 and four cursor control keys. Button switches 246 deliver on five output conductors 248 to switch multiplexer 244 status voltages representing ON-OFF condition of each such button. The multiplexing scheme requires eight rows 204 of output data to completely specify the status of the five buttons. The switch status bit for each of the remaining three of the eight rows 204 provides unused information.

Array 202 provides on output 250 a synchronization status bit as the analog output data for each row 204 appear on output conductors 212. Array 202 delivers the synchronization status bit to clock divider module 218, which in response thereto provides on an output 254 a 5.33 microsecond SHIFT/$\overline{\text{LOAD}}$ pulse at the beginning of each row 204. The synchronization status bit appears at the end, i.e.. in the sixteenth bit position, of each row 204. The synchronization status bit is in the logic 0 state for rows 1 through 42 and in the logic 1 state for row 43. The logic 1 state in row 43 clears clock divider module 218 at the end of each scan of array 202 to synchronize the clocks and thereby synchronize the switch status data of switch multiplexer 244.

Shift register 240 receives the 3 MHz SHIFT CLOCK appearing on output 228 of clock divider module 218 and provides on an output 252 at a 3 megabit rate a serial data bit stream comprising a continuous sequence of the 16-bit frames of output data. A 16-bit frame of output data is clocked out of shift register 240 during the 5.33 microsecond period of the ARRAY CLOCK.

A motion detection calculator 256 and image and switch data serial-to-parallel shift registers 258 receive the serial data stream on output 252 of shift register 240 and process the information in the manner described below. Motion detection calculator 256 receives the SHIFT/$\overline{\text{LOAD}}$ signal provided on output 254 of clock divider module 218 to correlate the serial data appearing on output 252 of shift register 240 to a corresponding frame for each scan of array 202.

Figure 10A:
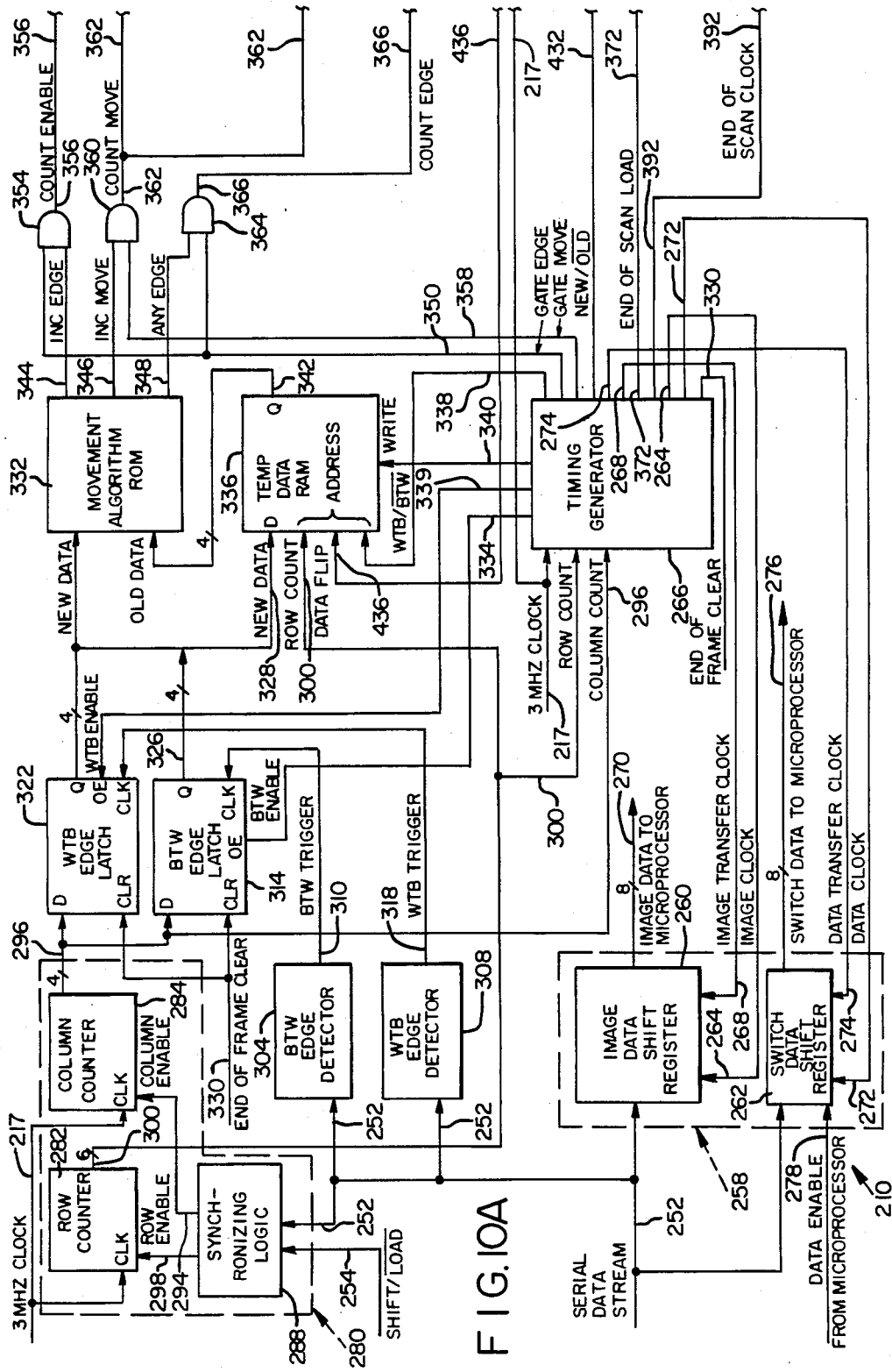
FIGS. 10A and 10B show a detailed block diagram of the motion detection circuitry shown in FIG. 9A and 9B.
Figure 10B:
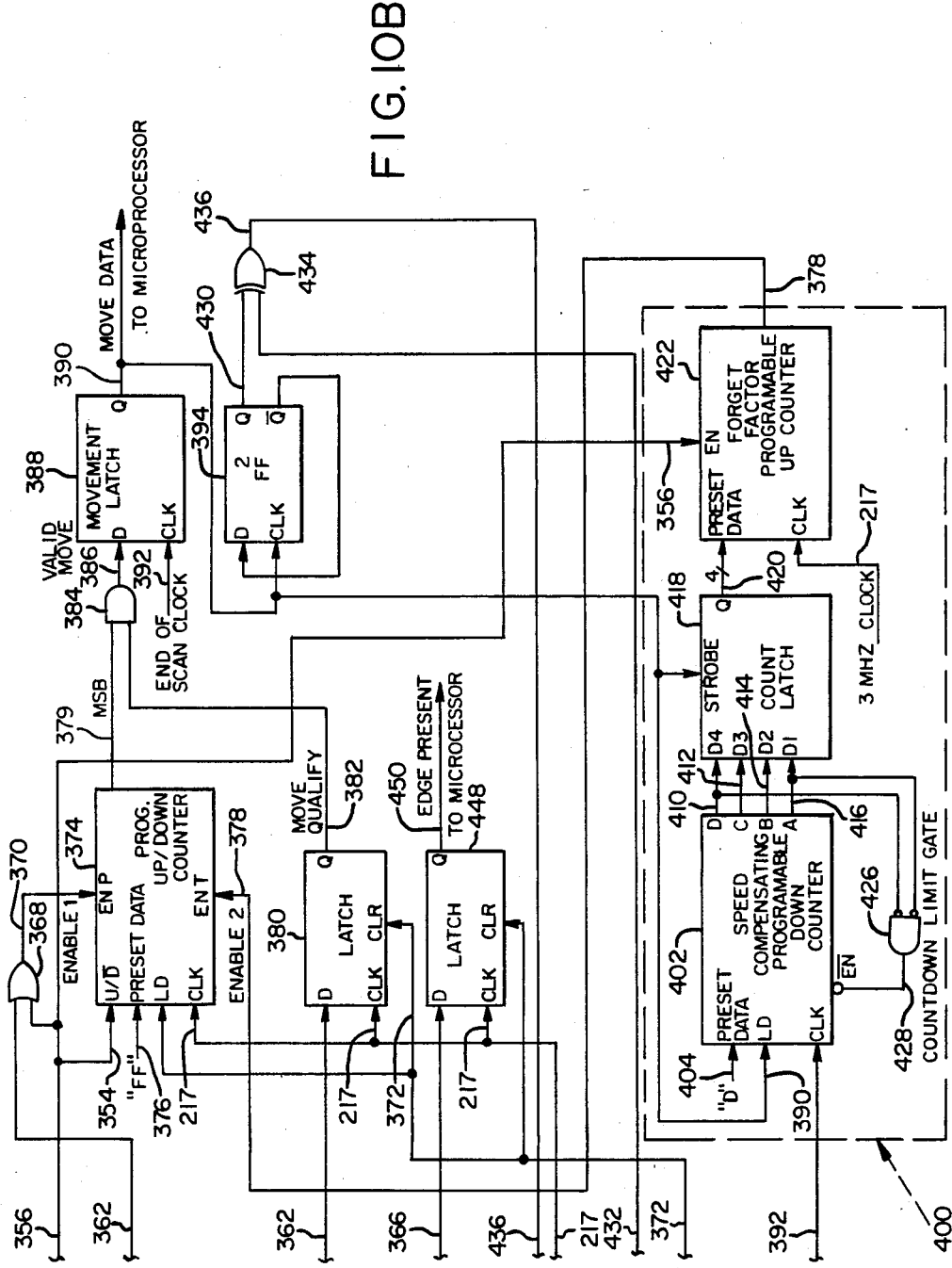

Referring to FIGS 10A and 10B, shift register 258 includes two sets of series-arranged or "pipelined" 8-bit serial-to-parallel shift registers 260 and 262. Each of shift registers 260 and 262 has an input stage and an output stage. Shift registers 260 and 262 are pipelined so that the input stage can accumulate "new" information while the output stage can hold "old" information. Shift register 260 receives the serial data stream from output 252 of shift register 240 (FIG. 9A) but stores in the input stage only the column 8 image data of array 202 for a single scan eight rows (one byte) at a time in response to an IMAGE CLOCK signal provided on an output 264 of a timing generator 266. Timing generator 266 provides on an output 268 an IMAGE TRANSFER CLOCK signal at the appropriate times to transfer the column 8 image data from the input stage to the output stage of shift register 260. The image data are presented on eight output conductors 270 for transfer to oscillator and microprocessor module 214 (FIG. 9B), while the input stage stands ready to collect column 8 image data for the next eight rows in the present scan or for the first eight rows in the next succeeding scan of array 202.

Shift register 262 receives the serial data stream from output 252 of shift register 240 (FIG. 9A), but stores in the input stage only the bit position 15 switch status bits of multiplexer 244 (FIG. 9A) for a single scan in response to a DATA CLOCK signal provided on an output 272 of timing generator 266. Timing generator 266 provides on an output 274 a DATA TRANSFER CLOCK signal at the appropriate times to transfer the bit position 15 switch status data from the input stage to the output stage of shift register 262. The switch data are presented on eight output conductors 276 for transfer to microprocessor module 214 (FIG. 9B), while the input stage stands ready to collect bit position 15 switch status data for the next succeeding scan of array 202. Clock oscillator and microprocessor module 14 provides on an output 278 a DATA ENABLE signal to effect the transfer of switch status data. To provide the IMAGE CLOCK, IMAGE TRANSFER CLOCK, DATA CLOCK, and DATA TRANSFER CLOCK signals at the appropriate times, timing generator 266 acquires from a data position counter circuit 280 the row and column position coordinates for each data bit in the serial data stream. The position coordinate information continually updates timing generator 266 to the position of the incoming data from shift register 240.

Referring to FIGS. 10 and 11, a data position counter circuit 280 receives the 3 MHz clock (FIG. 11, line A), the SHIFT/$\overline{\text{LOAD}}$ signal (FIG. 11, line B), and the serial data stream (FIG. 11, line C) to provide a pair of digital words representing the row and column positions of a corresponding bit in the serial data stream. Counter circuit 280 includes a 6-bit binary row counter 282 and a 4-bit binary column counter 284. Row counter 282 and column counter 284 receive from output 217 of clock divider 216 (FIG. 9B) the 3 MHz clock (FIG. 11, line A), which clocks counters 282 and 284 at the data rate of the serial data stream. Counter circuit 280 also includes a synchronizing logic circuit 288 which receives from output 254 of clock divider 218 and output 252 of shift register 240 (both outputs shown in FIGS. 9A and 9B) the SHIFT/$\overline{\text{LOAD}}$ signal and the serial data stream, respectively. Logic circuit 288 uses the SHIFT/$\overline{\text{LOAD}}$ signal to develop on an output 294 a COLUMN ENABLE signal for column counter 284. The COLUMN ENABLE signal effectively resets column counter 284 at the end of each frame of array 202 to permit column counter 284 to count at a 3 MHz rate the column positions of the data in the serial data stream. Column counter 284 provides on four output conductors 296 a 4-parallel bit digital word representing the column positions of the data read out of shift register 240.

Logic circuit 288 uses the SHIFT/$\overline{\text{LOAD}}$ signal together with the synchronization bit in the serial data stream to develop on an output 298 a ROW ENABLE signal for row counter 282. The ROW ENABLE signal permits row counter 282 to count at a 187.5 KHz rate the row positions of the data in the serial data stream. Row counter 282 provides on six conductors 300 a 6-parallel bit digital word representing the row positions of the data read out of shift register 240. Row counter 282 and column counter 284 provide, therefore, the corresponding position coordinates in array 202 of the synchronization, switch status, and image data bits forming the incoming serial data stream. The synchronization bit resets row counter 282 at the end of each scan of array 202. The digital words representing the column and row positions, together with the 3 MHz clock, are applied to timing generator 266 and are used to carry out the motion detection algorithm as will be described below.

The serial data stream delivered to motion detection circuit 210 is also applied from output 252 of shift register 240 (FIG. 9A) to an input of a black-to-white (BTW) edge detector 304 and an input of a white-to-black (WTB) edge detector 308. Each of the edge detectors 304 and 308 comprises a pair of flip-flop circuits that are reset upon completion of each 16-bit data frame. Edge detectors 304 and 308 scan from the bit or column position 14 to the bit or column position 1 of a row to locate the first BTW edge and the first WTB edge, respectively, in that row. Since the column 1 position is nearest the right-hand side of array 202 and first encounters optical data as mouse 20 moves in scanning direction 67, each of edge detectors 304 and 308 tracks in successive scans the same edge until it no longer appears in array 202.

Whenever it encounters a black-to-white edge (i.e. a transition from a logic 0 state to a logic 1 state) between adjacent bits in the data stream, BTW edge detector 304 develops on its output 310 a BTW trigger signal that is applied to the clock input of a BTW edge latch 314. The column position count of the image data bit that underwent the transition between logic states is delivered from output conductors 296 of column counter 284 to the data input conductors of, and is latched into, BTW edge latch 314. Whenever it encounters a white-to-black edge (i.e., a transition from a logic 1 state to a logic 0 state) between adjacent bits in the data stream, WTB edge detector 308 develops on its output 318 a WTB trigger signal that is applied to the clock input of a WTB edge latch 322. The column position count of the image data bit that underwent the transition between logic states is delivered from output conductors 296 of column counter 284 to the data input conductors of, and is latched into, WTB edge latch 322.

Each of edge latches 314 and 322 comprises series-connected or pipelined input and output flip-flop registers so that edge data can be held in and processed from the output registers while edge data from the next succeeding row accumulate in the input registers. The values stored in edge latches 314 and 322 are transferred in pipeline fashion to the output registers at the end of each frame so that the input registers can be cleared by an END OF FRAME CLEAR signal in preparation for the column count of the next succeeding frame. Timing generator 266 develops on its output 330 the END OF FRAME CLEAR signal at the end of each frame.

The column counts appearing on the four output conductors 328 of WTB latch 322 and output conductors 326 of BTW latch 314 are successively applied once for each frame to "new data" inputs of a movement algorithm read only memory (ROM) 332 and "new data" inputs of a temporary data random access memory (RAM) 336. The successive application of the column counts is accomplished by providing nonoverlapping WTB ENABLE and BTW ENABLE signals to the output enable inputs of latches 322 and 314. Timing generator 266 develops the WTB ENABLE and BTW ENABLE signals on outputs 333 and 334, respectively. RAM 336 also receives on six address inputs the row position count from output 300 of row counter 282. Timing generator 266 provides on an output 338 a WTB/$\overline{\text{BTW}}$ signal (FIG. 11, line D) that is applied to an address input of RAM 336. The WTB/$\overline{\text{BTW}}$ signal alternates logic states every one-half frame period (i.e., 42.67 microseconds) to either write into or read out of RAM 336 a WTB edge datum for the logic 1 state and a BTW edge datum for the logic 0 state.

Timing generator 266 provides on its output 340 a WRITE signal that controls the read and write functions of RAM 336. RAM 336 provides successively on four output conductors 342 to four input conductors of ROM 332 the column position counts representing the WTB and BTW edge "old data" of the corresponding row of the immediately preceding scan for comparison with the column position counts of the WTB and BTW edge "new data" applied to the inputs of ROM 332. It will be appreciated that the "new data" delivered to RAM 336 and accumulated on a row-by-row basis for a complete scan become the "old data" that appear on outputs 342 of RAM 336 for the following scan after the detection of valid movement, which is defined below. In the event edge detectors 304 and 308 detect no edges during a data frame, motion detection circuit 210 stores logic 0 states as "new data" in RAM 336.

An algorithm, which is implemented in a program inscribed in ROM 332, determines the logic states of three signals provided on outputs 344, 346, and 348 of ROM 332 in response to the logic states of the "new data" and "old data" values presented to it. The output signals include an increment edge count signal (INC EDGE), increment move count signal (INC MOVE), and any edge signal (ANY EDGE), which appear on outputs 344, 346, and 348, respectively, of ROM 332. The following is a summary of the six operating conditions under which ROM 332 provides different sets of output signals. The symbols "1", "0", and "N" appearing below represent a logic 1 state, a logic 0 state, and a boundary value (e.g. N=+1 or +2) of adjacent column positions in a row, respectively.

Condition 1:
If "new data"="old data"=0, then
ANY EDGE=0
INC EDGE=0
MOVE EDGE=0

Condition 1 represents the situation in which no edges are present in both "new data" and "old data."

Condition 2:
If "new data"="old data"≠0, then
ANY EDGE=1
INC EDGE=1
MOVE EDGE=0

Condition 2 represents the situation in which edges are present in both "new data" and "old data" but in which there was no edge movement for two successive scans of array 202.

Condition 3:
If $-N \leq$ ("new data"−"old data")$\leq +N$
and "old data" ≠0
and "new data"≠0, then
ANY EDGE=1
INC EDGE=1
MOVE EDGE=1

Condition 3 represents the situation in which edges are present in both "new data" and "old data" and in which the edges are located within a boundary of N column positions.

Condition 4:
If 0<"new data"≦N
and "old data"=0, then
ANY EDGE=1
INC EDGE=1
MOVE EDGE=1

Condition 4 represents the situation in which no edge is present in "old data" but an edge is present in "new data" and is within a boundary of N positions from the right side of array 202.

Condition 5:
If 0<(14− "old data")≦N
and "new data"=0, then
ANY EDGE=1
INC EDGE=1
MOVE EDGE=1

Condition 5 represents the situation in which an edge is present in "old data" but no edge is present in "new data," thereby indicating the edge has passed the column position 14 on the left side of array 202.

Condition 6:
ANY EDGE=1
INC EDGE=1
MOVE EDGE=0

Condition 6 represents all other situations in which edges are present in both "new data" and "old data" but are located outside a boundary of N column positions.

The INC EDGE signal and a GATE EDGE signal (FIG. 1, line E), which appears on output 350 of timing generator 266, are applied to different inputs of an AND gate 354, which provides on its output 356 a COUNT ENABLE signal. The INC MOVE signal and a GATE MOVE signal (FIG. 11, line F), which appears on an output 358 of timing generator 266, are applied to different inputs of an AND gate 360, which provides on its output 362 a COUNT MOVE signal. The ANY EDGE signal and the GATE EDGE signal are applied to different inputs of an AND gate 364, which provides on its output 366 a COUNT EDGE signal. The COUNT MOVE and COUNT ENABLE signals are applied to different inputs of an OR gate 368, which provides on its output 370 an ENABLE 1 signal. Timing generator 266 provides on an output conductor 372 an END OF SCAN LOAD signal that is applied to a load preset input of an 8-bit programmable binary up/down counter 374.

That every detected edge in a scan indicates movement as compared with the detected edges of the immediately preceding scan is an obvious indication that scanning movement of mouse 20 has occurred. That a significant fraction of the detected edges indicates movement as compared with the detected edges of the previous scan is an indication that valid scanning movement of mouse 20 possibly occurred. The fraction of detected edges necessary to indicate a scanning or valid movement is a function of the scanning speed of mouse 20 as it moves across the image. The following is a description of the manner in which this fraction is calculated.

Upon completion of every scan of array 202, the END OF SCAN LOAD signal changes to a logic 1 state to preset up/down counter 374 with a hexadecimal "FF" that is applied to preset input conductors 376. At the beginning of a scan of array 202, up/down counter 374 provides a hexadecimal "FF" on its output conductors. Up/down counter 374 receives from output 356 of AND gate 354 the COUNT ENABLE signal on its up/down (U/$\overline{D}$) input and the 3 MHz clock on its clock input to count the number of edges detected during each scan. Whenever it changes to a logic 1 state, which indicates the detection of an edge, the COUNT ENABLE signal allows the 3 MHz clock to increment up/down counter 374 by one count, depending on the logic state of an ENABLE 2 signal that is applied to input 378 of up/down counter 374. At all other times, the COUNT ENABLE signal is in the logic 0 state, which allows the 3 MHz clock to decrement up/down counter 374 by one count, depending on the logic state of the ENABLE 1 signal. Timing generator 266 phases the COUNT ENABLE and COUNT MOVE signals relative to the 3 MHz clock so that each moved edge in each successive row of the scan can decrement up/down counter 374 and only a fraction of the detected edges can increment up/down counter 374.

If during this scan the contents of up/down counter 374 do not change, the most significant bit (MSB), which appears on output 379 of up/down counter 374, would be in the logic 1 state. This condition indicates that no edges appeared during the entire scan. This would occur, for example, when array 202 is positioned over an all-white field or an all-black field. Under these conditions, the COUNT MOVE signal appearing on output 362 of AND gate 360 and applied to the data input of a latch 380, remains in the logic 0 state during the entire scan. Latch 380, which receives on its clock input the 3 MHz signal, provides on its output 382 a MOVE QUALIFY signal in the logic 0 state whenever no edges are detected and in the logic 1 state whenever one or more moved edges are detected.

If the contents of up/down counter 374 changed during the scan, the logic state of MSB output 379 indicates whether a sufficient number of edges moved to validate the scanning movement. A logic 0 state of MSB output 379 indicates that the fraction of moved edges was insufficiently large, and a logic 1 state of MSB output 379 indicates that valid movement may have occurred, depending on the state of the MOVE QUALIFY signal. The MOVE QUALIFY signal and the MSB output of up/down counter 374 are applied to different inputs of an AND gate 384, which provides on its output 386 a VALID MOVE signal. The VALID MOVE signal is in the logic 1 state whenever a valid movement occurs and is in a logic 0 state whenever no valid movement occurs. Whenever no edges, and perforce no moved edges, are present during a scan of array 202, the MOVE QUALIFY signal is in the logic 0 state, which causes the VALID MOVE signal to be in the logic 0 state. The VALID MOVE signal is applied to the data input of a movement latch 388, which provides on its output 390 a MOVE DATA signal in response to an END OF SCAN CLOCK signal. The END OF SCAN CLOCK signal is developed on output 392 of timing generator 266 and constitutes a pulse appearing at the end of the scan of array 202.

The MOVE DATA signal in the logic 1 state appears on output 390 of movement latch 388 upon completion of a scan during which valid movement occurred. A MOVE DATA signal in a logic 1 state initiates three important functions in motion detection circuit 210. These functions include (1) activating the operation of a velocity compensation circuit 400 that controls the logic state of the ENABLE 2 signal applied to input 378 of up/down counter 374, thereby determining the fraction of edges required to indicate valid movement, (2) toggling a flip-flop 394 that changes the address of RAM 336 such that the "new data" inscribed therein becomes the "old data" in preparation for the collection of edge data from the next succeeding scan of array 202, and (3) triggering the oscillator and microprocessor module 214 to accumulate forty bits representing column 8 image data from shift register 260 during the next succeeding scan of array 202.

Velocity compensation circuit 400 operates under the principle that a valid movement takes place whenever a fractional majority of edges has moved in comparison to the positions the edge occupied during an immediately preceding scan. Empirical data compiled and computer simulations performed by certain ones of the applicants show that the magnitude of the scanning speed (i.e., the velocity of mouse 20 moving across the surface) dictates the size of the fractional majority of edges required to constitute valid movement. A relatively fast scanning speed would require a lower fractional majority of edges than would a relatively slow scanning speed. The reason is that, for a particular scanning speed, the image would be under-sampled whenever the fractional majority is too high and would be over-sampled whenever the fractional majority is too low. Over-sampling and under-sampling tend to, respectively, widen and narrow the image characters.

Velocity compensation is implemented in motion detection circuit 210 by the operation of velocity compensation circuit 400, which controls the logic states of the ENABLE 2 signal applied to input 378 of up/down counter 74. Velocity compensation circuit 400 permits all detected edge movements to decrement, but only some of the detected edges to increment, up/down counter 374. The permissible number of detected edges that increment up/down counter 374 is determined by a selected one of eight predetermined "forget factors" which control the number of logic transitions of the ENABLE 2 signal applied to input 378 of up/down counter 374. A particular "forget factor" is selected in relation to the rate at which valid movements occurred during previous scans. The "forget factor" for a given scanning speed is chosen so that the MSB on output 379 of up/down counter 374 will be a logic 1 state whenever the empirically derived percentage of the detected edges have moved upon completion of a scan of array 202.

The "forget factor" is developed by a speed compensation down counter 402 in velocity compensation circuit 400. Down counter 402 receives a hexadecimal "D" on its four preset input conductors 404, the END OF SCAN CLOCK signal on its clock input, and the MOVE DATA signal on its load preset input. Down counter 402 is preset with the hexadecimal "D" upon completion of each scan of array 202 during which valid movement has occurred.

A 4-parallel bit binary word corresponding to the "forget factor" appears on output conductors 410, 412, 414, and 416 of down counter 402 prior to the presetting of hexadecimal "D" into down counter 402. Outputs 410 and 416 represent the most significant bit and the least significant bit, respectively, of the "forget factor" word. The "forget factor" word is applied to the inputs of a count latch 418, whose four output conductors 420 deliver the latched "forget factor" word to the preset inputs of a 4-bit programmable up counter 422. A new forget factor word is latched into count latch 418 just prior to the presetting of down counter 402. Up counter 422 provides on an output the ENABLE 2 signal, which is applied to input 378 of up/down counter 374. Velocity compensation circuit 400 operates in the following manner.

Upon completion of each scan during which the MOVE DATA signal indicates (by changing to a logic 1 state) that valid movement occurred, the END OF SCAN CLOCK signal changes to a logic 1 state to preset down counter 402 with a hexadecimal "D." The END OF SCAN CLOCK signal decrements down counter 402 upon the completion of each scan during which the MOVE DATA signal indicates (by remaining in a logic 0 state) that no valid movement occurred. Whenever the "forget factor" word of down counter 402 reaches a minimum value of hexadecimal "6," the MSB output 410 and the LSB output 416, which are applied to different inputs of a NOR gate 426, cause a logic 1 state to appear on the output 428 of NOR gate 426. This prevents down counter 402 from decrementing below the hexadecimal "6" minimum value, which remains until the MOVE DATA signal indicates the completion of a scan of array 202 during which valid movement occurred. The MOVE DATA signal then presets down counter 402 with a hexadecimal "D" in the manner described above.

Before it causes down counter 402 to be preset with a hexadecimal "D," the MOVE DATA signal, which is applied to a strobe input of count latch 418, latches into count latch 418 the "forget factor" word value provided at the output conductors of down counter 402. The "forget factor" word value remains unchanged in count latch 418 until the next MOVE DATA signal indicates that valid movement occurred.

Up counter 422 receives on its enable input the COUNT ENABLE signal appearing on output 356 of AND gate 354 and on its clock input the 3 MHz clock. Up counter 422 increments one count each time the COUNT ENABLE signal indicates the presence of an edge detected by either BTW edge detector 304 or WTB edge detector 308. Up counter 422 monitors, therefore, the number of edges detected in the serial data stream. The "forget factor" word value applied to preset inputs of up counter 422 inhibits its output from providing a logic state transition for some of the edges detected in the serial stream. Since the output of up counter 422 provides the ENABLE 2 signal to input 378 of up/down counter 374, the "forget factor" word value causes the suppression of a number of detected edges that otherwise would have incremented up/down counter 374. Table 1 summarizes for each "forget factor" word value of down counter 402, the corresponding "forget factor," and the corresponding number of scans for which the MOVE DATA signal indicates that valid movement has occurred.

TABLE 1

| Forget Factor Word Value (Hexadecimal) | Forget Factor | Number of Scans Between Valid Movements |
| --- | --- | --- |
| D | 1 of 3 | Every Scan |
| C | 1 of 4 | Every Other Scan |
| B | 1 of 5 | Every Third Scan |
| A | 1 of 6 | Every Fourth Scan |
| 9 | 1 of 7 | Every Fifth Scan |
| 8 | 1 of 8 | Every Sixth Scan |
| 7 | 1 of 9 | Every Seventh Scan |
| 6 | 1 of 10 | Every Eighth Scan or More |

Table 1 indicates, for example, that one of three detected edges is suppressed whenever the MOVE DATA signal indicates valid movement has been detected in every previous scan and that one of ten detected edges is suppressed whenever the MOVE DATA signal indicates movement has been detected in only one of every eight or more previous scans.

It will be appreciated that the logic states of the MOVE DATA signal control the value of the "forget factor" word in velocity compensation circuit 400, which in turn controls the number of edges counted by up/down counter 374 to control the logic states of the MOVE DATA signal. A feedback arrangement of this type provides image sampling as a function of the estimated instantaneous scanning velocity of mouse 20. The calculated velocity is an estimate because the movement of mouse 20 is sampled in discrete time intervals, e.g., in the preferred embodiment, at a 3 MHz rate.

Whenever it indicates that valid movement has occurred, the MOVE DATA signal changes from a logic 0 state to a logic 1 state and thereby toggles the clock input of D flip-flop 394 whose Q output 430 changes its logic state. The Q output 430 of flip-flop 394 and the NEW/OLD signal appearing on output 432 of timing generator 266 are applied to different inputs of an EXCLUSIVE-OR gate 434 whose output delivers a DATA FLIP signal to address input 436 of RAM 336.

This data flipping allows the past "new data" to become the present "old data," and the past "old data" is then allowed to be overwritten with future "new data." The NEW/OLD signal changes logic states to control the address of RAM 336 so that it holds "new data" in the memory location allocated for writing data and holds "old data" in the memory locations allocated for reading data. EXCLUSIVE-OR gate 434 is effectively a programmable inverter controlled by the logic state of the NEW/OLD signal.

Whenever it indicates that valid movement has occurred, the MOVE DATA signal triggers an interrupt function in oscillator and microprocessor module 214 (FIG. 9B) to enable the microprocessor to receive the corresponding column 8 image data appearing on output conductors 270 of shift register 260. These data are ultimately transmitted 436 transfer the column 8 image data in response to address bus, address enable, and I/0 signals provided on the respective bus conductors 440, 442, and 444 from the host computer to a bus address decoder 446.

A latch 448 receives on its data input the COUNT EDGE signal appearing on output 366 of AND gate 364, the 3 MHz clock on its clock input, and the END OF SCAN LOAD signal on its clear input. For each scan, latch 448 responds to all detected edges, including those not corresponding to moved edges, and provides on its output 450 an EDGE PRESENT signal for transmittal to oscillator and microprocessor module 214 (FIG. 9B). The oscillator and microprocessor module 214 uses the MOVE DATA signal to compute the average number of scans between valid movements. The results of this computation are used to provide an estimate of the proper spacing between optical character data when no edges are present. This would be true whenever optical character data are separated by large areas of uniform brightness (i.e.. typically white spaces).

Oscillator and microprocessor module 214 accomplishes this task by sampling the EDGE PRESENT signal to determine its logic state. The EDGE PRESENT signal in the logic 0 state indicates the presence of no edges and triggers oscillator and microprocessor module 214 to activate a timer. The timer provides a signal upon detection of no edges and the completion of a time interval corresponding to the computed number of scans between valid movements. This signal causes oscillator and microprocessor module 214 to provide to the host computer column 8 image data of the type last detected (i.e., usually white).

Oscillator and microprocessor module. 214 continues this process until the hardware indicates a return of detected edges, whereupon the instantaneous scanning velocity of mouse 20 is once again computed. The computed average number of scans between movements is very similar to that employed in the first preferred embodiment in computing the scanning velocity of mouse 20.

Having described and illustrated the principles of our invention with reference to preferred embodiments and several applications and variations thereof, it should be apparent to those skilled in the art that the invention may be modified in arrangement and detail without departing from such principles. We claim all modifications coming within the scope and spirit of the following claims.

We claim:

1. A method for scanning a pattern of optical information on a surface, comprising:

projecting a plurality of first imaging elements along a line onto the surface;

projecting at least two second imaging elements onto the surface alongside the line of first imaging elements;

moving the first and second imaging elements laterally of the line in a scanning direction across the pattern;

sensing an optical state of the second imaging elements;

detecting a change in the optical state of the second imaging elements corresponding to relative movement between the second imaging elements and the pattern;

calculating an average rate of the relative movement;

generating a signal in accordance with the detected change in optical state of the second imaging elements;

in response to the signal, sensing at periodic intervals corresponding to the calculated average rate of movement an optical state of the first imaging elements corresponding to a portion of the pattern along the line;

detecting a uniform optical state of the second imaging elements; and initiating the sensing of optical state of the first imaging elements at the periodic intervals so long as the uniform state continues to be detected.

2. A method for scanning a pattern of optical information on a surface, comprising:

projecting a plurality of first imaging elements along a line onto the surface;

projecting at least two second imaging elements onto the surface alongside the line of first imaging elements;

moving the first and second imaging elements laterally of the line in a scanning direction across the pattern;

sensing an optical state of the second imaging elements;

detecting a change in the optical state corresponding to relative movement between the second imaging elements and the pattern;

generating a signal in accordance with the detected change in optical state of the second imaging elements;

in response to the signal, sensing an optical state of the first imaging elements corresponding to a portion of the pattern along the line;

starting a first timer when a first change is detected in the optical state of the second imaging elements;

stopping the first timer when a next change is detected in the optical state of the second imaging elements;

storing in a memory the elapsed time measured by the timer;

calculating from the elapsed time stored in the memory an average time interval between detected changes in the optical state of the second imaging elements;

repeating the above sequence of starting and stopping the first timer, storing the measured time, and calculating an updated average time each time a change is detected in the optical state of the second imaging elements; and while the above sequence is repeating, concurrently executing the steps:

starting a second timer;

when the second timer has reached the average time most recently computed in the above-described sequence of steps, sensing the optical state of the first imaging elements; and repeating the above two steps.

3. The method of claim 2, in which the storing step includes storing a predetermined number of successive elapsed times and, each time the above sequence is repeated, deleting the oldest stored time and storing the most recent elapsed time.

4. The method of claim 3, including initially storing a predetermined average time interval.

5. The method of claim 2, in which the storing step includes storing up to a predetermined number of successive elapsed times and, each time the above sequence is repeated, summing the stored times and dividing by the number of stored times, to calculate the average time interval.

6. A method of detecting movement of an optical scanning device in a scanning direction relative to a surface on which optical data appear, comprising:

projecting onto the surface plural optical imaging elements arranged in rows and columns to form a two dimensional array, the rows having directional components generally parallel to the scanning direction;

moving the array of optical imaging elements relative to the surface in the scanning direction;

sensing from the array of optical imaging elements a sequence of frames of output data corresponding to the optical data; and computing from the frames of output data estimates of the speed of the movement of the array of optical imaging elements relative to the surface, the computation of the estimates of the speed of movement including detecting in a frame of output data for each row in the array, positions of adjacent imaging elements providing different output data;

detecting in a succeeding frame of output data for each row in the array, positions of adjacent imaging elements providing different output data; calculating the number of changes of positions of the adjacent imaging elements for the frame and the succeeding frame of output data; and determining whether the number of changes of positions exceeds a predetermined standard value, thereby to provide an indication of the amount succeeding frames of output data.

7. A method of detecting movement of an optical scanning device in a scanning direction relative to a surface on which optical data appear, comprising:

projecting onto the surface plural optical imaging elements arranging in rows and columns to form a two dimensional array, the rows having directional components generally parallel to the scanning direction;

moving the array of optical imaging elements relative to the surface in the scanning directions;

sensing from the array of optical imaging elements a sequence of frames of output data corresponding to the optical data; detecting in a frame of output data for each row in the array, positions of adjacent imaging elements providing different output data;

detecting in a succeeding frame of output data for each row in the array, positions of adjacent imaging elements providing different output data;

calculating the number of changes of positions of the adjacent imaging elements for the frame and the succeeding frame of output data;

calculating ratios of the number of changes of positions from a frame to an adjacent frame for successive frames in the sequence; and comparing the computed ratios to a predetermined standard value to provide an estimate of the instantaneous speed of the relative movement.

* * * * *